June 17, 1930.  J. F. HOWELL  1,764,407
MOUNT FOR MOVING PICTURE CAMERAS
Filed Feb. 9, 1927  3 Sheets-Sheet 2
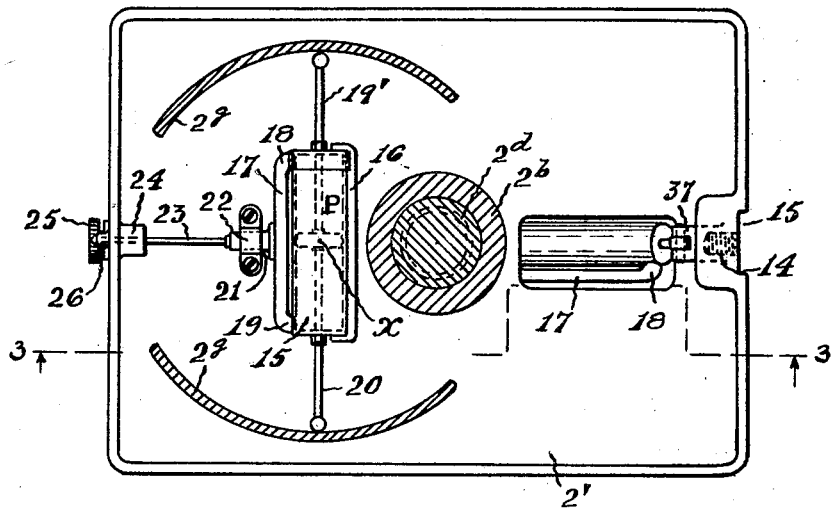
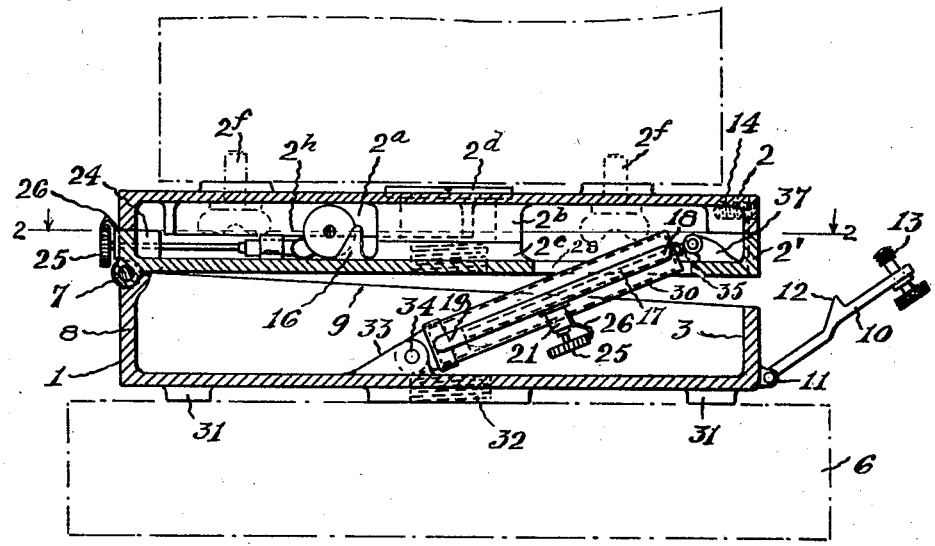
INVENTOR
John F. Howell,
BY
Harold D. Penney  ATTORNEY

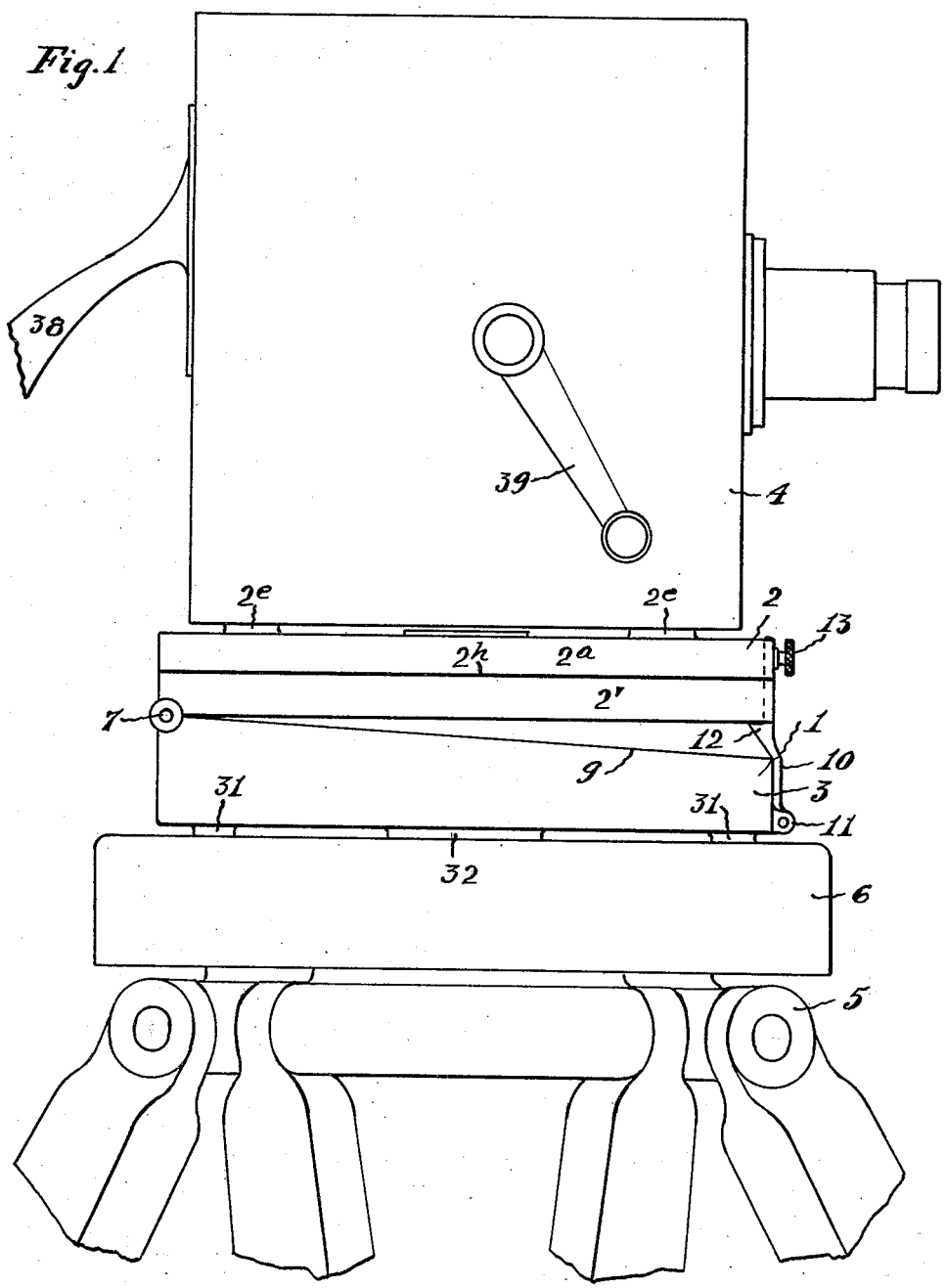

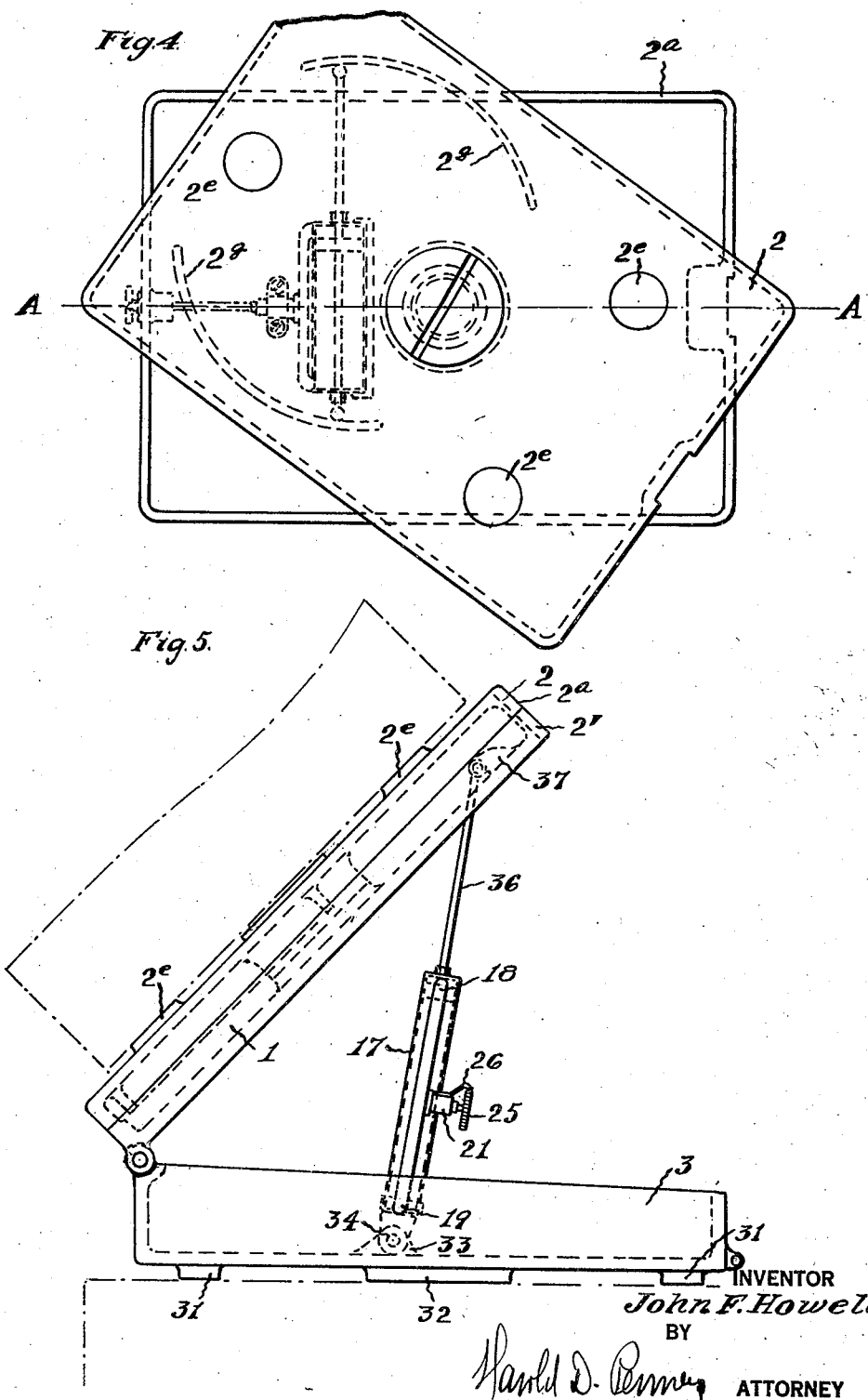

Patented June 17, 1930

1,764,407

UNITED STATES PATENT OFFICE

JOHN F. HOWELL, OF BALDWIN, NEW YORK, ASSIGNOR TO AKELEY CAMERA, INC., OF NEW YORK, N. Y., A CORPORATION OF NEW YORK

MOUNT FOR MOVING-PICTURE CAMERAS

Application filed February 9, 1927. Serial No. 166,973.

This invention relates to supports for motion picture cameras and like machines for regulating and steadying the movement and speed of the camera while the camera is being angularly moved in any desired plane.

The invention relates more particularly to an alternative form of control means of the general type shown in the United States patent to Akeley issued March 8, 1915, No. 1,177,165. Said patent shows a means mounting a camera support for movements in more than one plane, and means for steadying and retarding said movements.

One object of the present invention is to provide an extremely simple retarding and steadying device for a control means of this kind.

Another object of the invention is to provide a simple and strong universal mounting of this kind which is suitable for use with any effective adjusting means.

Another object of the invention is to provide in an apparatus or device of this kind, a suitable means whereby the universal mounting may be locked against movement.

Other objects of the invention are to improve generally the simplicity and efficiency of such devices and to provide a device or apparatus of this kind which is steady, reliable and durable in operation, and economical to manufacture.

Still other objects of the invention will appear as the description proceeds; and while herein details of the invention are described and claimed, the invention is not limited to these, since many and various changes may be made without departing from the scope of the invention as claimed in the broader claims.

The inventive features for the accomplishment of these and other objects are shown herein in connection with an improved camera mounting which, briefly stated, includes means mounting the camera for movements in more than one plane, and means including dash pots for retarding said movements.

Less briefly stated, the mounting includes an upper platform comprising upper and lower relatively rotary sections, the lower section being hinged to the lower platform adapted to be mounted on a tripod, said upper section carrying the camera.

A dash pot cylinder mounted fast across the lower section carries therein a piston carrying a piston rod projecting at both ends and arcuate cam flanges mounted fast on the upper section and engaging said ends, the cams being a shape to cause sliding of the rod when the upper section is rotated, thus to retard the horizontal movement.

Another dash pot which has its lower end pivoted to said lower platform and its piston rod pivoted to said lower section retards movement of the camera in a vertical plane.

A valve interposed in transfer ducts connecting opposite ends of the respective dash pots may be adjusted to regulate the amount of retarding by the fluid in the dash pot, thereby to regulate the speed of the movements.

In the accompanying drawing, showing by way of example, one of many possible embodiments of the invention, Fig. 1 is a side elevation of my device mounted upon a tripod and supporting a camera;

Fig. 2 is a sectional view of my controlling mount taken on the line 2—2, Fig. 3, looking in the direction of the arrows;

Fig. 3 is a sectional view of my structure taken on the line 3—3, Fig. 2, looking in the direction of the arrows;

Fig. 4 is a fragmental plan of my device with the camera removed; and

Fig. 5 is a side elevation of my device showing the upper platform raised.

In general, my device comprises a camera mount 1, and is formed of an upper platform housing or movable support 2 and a lower platform, or stationary support 3, within the interior of which platforms are housed the operative mechanisms about to be described. As is shown in Fig. 1, my device may be interposed between a camera 4 of well known type such as a moving picture camera, and a standard tripod 5 having a platform 6 thereon. While in the present instance I have shown the tripod and camera as separate elements in the combination, it will be easily understood that the camera and tripod may be built so that their structures will coordinate directly with my control structure.

As shown in Figs. 2 and 3, the upper platform 2 may be preferably in the form of a complete enclosed housing, at the rear end of which it is pivotally connected or hinged as at 7 to the lower platform or housing 8 which is partially enclosed at the bottom and sides with an open top. It will be noted that the side walls of the bottom platform are, as at 9, slightly downwardly tapered, to permit the camera being downwardly pointed an angle below the horizontal when desired.

When my apparatus is not in use as a panoramic or a universal control mount for cameras, the two platforms 2 and 3 may be locked together at a point opposite to the hinge 7 by means of a latch 10 (Fig. 3) which is pivotally mounted as at 11 to the lower front edge of the platform 3 and has a latch tongue 12 at its mid section, and at its free end rotatable means such as a thumb screw 13 which engages in a threaded bore 14 in the upper front end of the housing 2, and when this latch is in engaged position as indicated in Fig. 1, it locks the upper and lower platforms in horizontal alinement against vertical movement and due to an inset rabbet 15 (Fig. 2) into which the said latch enters, horizontal movement is also prevented so that when in latched and engaged position the mount becomes in effect a rigid solid mount between the camera and the tripod.

When it is desired to utilize the camera for vertical or horizontal control movement or in angular combination therebetween, this latch is released and thrown out, as in Fig. 3, which releases all three of the controlling elements for controlled panoramic action, as will now be described.

The upper housing 2 is divided into an upper and a lower element or section 2' and 2ª which are split at about the line 2ʰ. Both of said sections are provided with a pair of oppositely located registering hubs 2ᵇ and 2ᶜ held together for relative pivotal movement by means of a threaded shouldered stud 2ᵈ which permits rotative movement of the upper section of the housing 2ª, as indicated in Fig. 4, which shows the upper housing 2ª moved a number of degrees from the lens axis AA. The parting line 2ʰ is substantially on the section line 2—2, Fig. 3, so that the upper housing 2ª is horizontally movable within certain limits on either side of the said line AA.

The upper housing 2ª, Fig. 4, is provided with a series of bosses 2ᵉ which are drilled to receive therein a plurality of thumb nuts 2ᶠ, Fig. 3, whereby the camera may be rigidly and removably fixed to the top of the housing 2.

The under side of the said housing member 2ª is also provided with two spaced arcuate cam flanges 2ᵍ, opposedly mounted one to the other, as indicated in Figs. 2 and 4, having inner faces approximately arcuate to the point X, Fig. 2, which is in normally central position of a dash pot 15, held fast in the holding bracket 16 preferably integrally mounted upon the face of the lower housing section 2'. The dash pot is provided with a transfer duct 17, the opposite ends of which, as at 18 and 19 open into opposite ends of the dash pot cylinder 15 whereby during movement within the dash pot of the piston P by the thrust of either piston rod 19' or 20 from either side, the liquid within the said dash pot, which may be of a suitable oil or glycerine, is caused to flow from one end of the piston to the other by the movement of the piston through a needle valve 21 at the mid point of the duct.

The needle valve 21 is in the form of a cylindrical extension held upon the bottom of the lower housing element 2' by a clamp 22 secured by suitable screws at opposite ends, as shown in Fig. 2. From the needle valve 21 extends a needle shank 23, the inner end of which is developed into a needle valve of usual construction, the outer end being mounted in a bushing 24 which may be integral with the bottom of the lower section 2'. The outer end of said shank 23 is provided with a milled thumb nut 25 which coordinates with a spring ratchet member 26 to hold the nut against accidental turning and to permit the turning of the milled thumb nut 25 to cause the needle within the valve 21 to increase or decrease the port opening between opposite ends of the transfer duct 17, thereby throttling the flow of liquid between said two ends or cutting off the flow entirely, if desired.

Partially closing the needle valve retards the flow of liquid through the by-pass duct 17, thereby slowing down the piston action. More opening of the valve permits a greater flow of fluid and exercises less restraint upon the passage of fluid through the by-pass duct 17 so that proper adjustments of the needle valve permits easy movement of the piston P to either side, according to the direction of movement of the camera.

The bottom wall of the lower section is provided with a large opening 28 to the front of said hubs 2ᶜ, 2ᵈ in which opening is disposed an additional dash pot 30 interposed between the upper and lower platforms and having its lower end pivoted on a pin 34 between a pair of spaced lugs 33 on the floor of the lower platform at about the mid part thereof and its piston rod 35 projected from the upper end of the dash pot and pivoted between a pair of spaced ears 37 on the bottom wall of the lower section 2' to the front of said opening 28, whereby the tilting movement of the camera is retarded. This dashpot is also provided with a transfer duct 17 connecting opposite ends of the dash-pot as at 18 and 19 and a needle valve 21 interposed in the transfer duct for throttling or cutting off the flow of fluid therein, said valve being provided with a milled nut 25 on the end of the valve stem engaged by the spring ratchet 26 all similar to the valve of the upper dash pot except that the milled nut of the latter is disposed outside of the wall housing.

When operating the camera for universal movement, the latch 10 is unfastened and the valves 21 adjusted to give the desired resistance. The camera is then moved by means of the handle 38 in any direction in any desired curved or straight path, while the operator operates the crank, the dash pots offering resistance to the movement and holding it to substantial uniformity, entirely free of jerks or undesirable sudden variations in speed or direction.

By securing the latch 10, the mounting can be used as a stationary mount suitable for motion picture cameras or still cameras.

The milled nuts 25 being separably adjustable, may be adjusted to give different amounts of retardation in vertical and horizontal planes.

I claim:

1. In combination, a platform comprising upper and lower relatively rotary sections; a guiding means mounted fast across the lower section; a rod guided therein and projecting at both ends; means retarding movement of said rod; and arcuate cam flanges fast on the upper section and engaging said ends, the cam being of a shape to cause sliding of the rod when the upper section is rotated.

2. In combination, a platform comprising upper and lower relatively rotary sections respectively having top and bottom walls; registering hubs respectively fast on the inner face of said top and bottom walls; a stud in said hubs pivotally connecting the hubs, whereby rotary movement in a plane parallel to the lower section may be imparted to the upper section, as a camera mounted on the upper section is pointed to the right or left; a dash pot mounted fast transversely of the bottom of the lower section a distance from said hubs; a piston rod therein carrying a piston and projecting at both ends and provided with a ball on each end; and a pair of arcuate cam flanges fast on the inner face of the upper section and respectively engaging said balls, the cams being such a distance apart and of such shape that a snug sliding engagement with both balls is maintained for all relative positions of the sections for retarding the pivotal movement of the upper section.

3. In combination, a platform comprising upper and lower box-like sections; a dash pot mounted fast across the lower section; a piston rod therein carrying a piston and projecting at both ends; arcuate cam flanges fast on the upper section and engaging said ends; a transfer duct connecting opposite ends of each dash pot; a needle valve interposed in the transfer duct and for throttling or cutting off the flow of fluid therein and provided with a milled nut on the end of the valve stem, the valve stem nut being disposed outside of the wall of the lower section.

4. In combination, a lower platform having a floor; an upper platform hinged at one edge to the lower platform and having a bottom wall provided with a large opening at the rear thereof; a pair of spaced ears on the bottom wall to the rear of said opening; a pair of spaced lugs on the floor of the lower platform at about the mid part thereof; and a dash pot having its lower end pivoted to said lugs and its piston rod projected from the upper end and pivoted to said ears, whereby the tilting movement of the upper platform is retarded.

5. In combination, a lower platform; an upper platform comprising upper and lower relatively rotary sections, the lower section being hinged to the lower platform; a dash pot mounted fast across the lower section; a piston rod therein carrying a piston and projecting at both ends; arcuate cam flanges fast on the upper section and engaging said ends, the cams being of a shape to cause sliding of the rod when the upper section is rotated; and a dash pot having its lower end pivoted to said lower platform and its piston rod pivoted to said lower section.

6. In combination, a lower platform; an upper platform comprising upper and lower relatively rotary sections, the lower section being hinged to the lower platform; a dash pot mounted fast across the lower section; a piston rod therein carrying a piston and projecting at both ends; arcuate cam flanges fast on the upper section and engaging said ends, the cams being of a shape to cause sliding of the rod when the upper section is rotated; a dash pot having its lower end pivoted to said lower platform and its piston rod pivoted to said lower section; a transfer duct connecting opposite ends of each dash pot; and a valve interposed in each transfer duct.

7. In combination, an upwardly open box-like lower platform adapted to be attached to a tripod and having its top edges rearwardly inclined; an upper platform comprising upper and lower sections, each having an edge recess; means for mounting a motion picture camera on the upper section, an edge of the lower section being hinged to an edge of the lower platform, whereby the camera may be tilted up or down; and a releasable latch pivotally connected to the lower platform and engageable under the upper platform and into said recesses.

8. In combination, a lower platform adapted to be attached to a tripod; an upper platform having a threaded bore in one edge; means for mounting a motion picture camera on the upper section, an edge of the upper platform being hinged to the corresponding edge of the lower platform, whereby the camera may be tilted forwardly up or down; means for retarding relative movement between the platforms; a releasable latch pivotally connected to the lower platform at the side opposite to the hinge and engageable with the upper platform for locking them in parallel relation; and a screw in said latch engageable in said bore.

9. In combination, a rectangular platform comprising contacting upper and lower sections having top and bottom walls respectively; means for mounting a motion picture camera on the upper section, including thumb screws passing through said top wall near edges thereof and having manipulating heads below said top walls; registering hubs respectively fast on the inner face of said top and bottom walls; a stud in said hubs pivotally connecting the hubs, whereby rotary movement in a plane parallel to the lower section may be imparted to the upper section, so as to expose said heads.

10. In combination, a camera support, means mounting said support for movements in more than one plane, said means including a pair of hinged members, retarding means between one of said members and said support, and retarding means between said members, and means for locking said support against said movements.

11. A device of the character described, comprising a motion picture camera, a fixed member, a tilting member hingedly associated with said fixed member, a camera supporting member rotatably associated with said tilting member, the axis of rotation of said supporting member relative to said fixed member extending at right angles to the axis of rotation of said tilting member, means for steadying the rotation of the camera relative to said tilting member, and means for steadying the rotation of said tilting member.

12. In combination, with a camera, a lower platform, a member tiltably associated with said platform, a member rotatably associated with said first member and supporting said camera, retarding means between said tiltable and rotatable members, and retarding means between said tiltable member and said lower platform.

13. In a support for cameras a stationary platform, a movable platform, positioned above said stationary platform and pivotally connected thereto at one point thereof, to be turned in a vertical plane, a resistance member, to oppose said turning motion, pivotally connected to said stationary platform, and an expansible part on said member, pivotally connected to another point on said movable platform, to be turned in a vertical plane, thereby serving to retard the turning motion of said platforms with relation to each other.

14. In a support for cameras a lower platform section, an upper platform section, pivotally connected thereto, to be turned with relation to each other in a plane, which is substantially parallel to said sections, a dash pot, connected to one of said sections, one or more cams on the other of said sections, eccentrically positioned with relation to said pivotal connection, a piston and one or more piston rods on said dash pot, having their ends in contact with said cams and impelled thereby, when said sections are turned with relation to each other, thereby serving to retard the turning motion of said sections with relation to each other.

15. In a support for cameras a lower platform section, an upper platform section, pivotally connected thereto, to be turned in a plane, which is substantially parallel to said sections, a resistance member having thereon a part of variable position, connected to one of said sections, to oppose said turning motion, one or more cams on the other of said sections, eccentrically positioned with relation to said pivotal connection, one or more extensible parts on said member, having their ends in contact with said cams and impelled thereby when said sections are turned with relation to each other, thereby serving to retard the turning motion of said sections with relation to each other.

16. In a support for cameras a pair of platforms, pivotally connected to each other, to be turned with relation to each other in a plane transversely to said platforms, a resistance member, to oppose said turning motion, pivotally connected to one of said platforms, and an expansible part on said member, pivotally connected to the other of said platforms, to be turned in a plane transversely to said platforms, thereby serving to retard the turning motion of said platforms with relation to each other.

17. In a support for cameras a stationary platform, a movable platform, comprising an upper and a lower section, pivotally connected to each other, to be turned with relation to each other in a plane, which is substantially parallel to said sections, the lower of said sections being pivotally connected to said stationary platform, to be turned with relation thereto in a plane transversely to said platforms, thereby forming a universal connection between said stationary platform and the upper of said sections, a resistance member, pivotally connected at one end thereof to said stationary platform, to be turned in a plane transversely thereto, an expansible part at the other end of said member, pivotally connected to said lower section, to resist the turning thereof on said stationary platform, another resistance member, secured to one of said sections and having thereon one or more extensible parts, means on the other of said sections to impel said parts when said sections are turned with relation to each other, thereby retarding the turning motion of said sections with relation to each other.

18. In a support for cameras a stationary platform, a movable platform, comprising an upper and a lower section, pivotally connected to each other, to be turned with relation to each other in a plane, which is substantially parallel to said sections, the lower of said sections being pivotally connected to said stationary platform, to be turned in a plane transversely to said platforms, thereby forming a universal connection between said stationary platform and the upper of said sections, a means for retarding the turning of said lower section on said stationary platform and a means for retarding the turning of said sections with relation to each other.

19. In a support for cameras a stationary platform, a housing formed therein, a movable platform comprising an upper and lower section, another housing, enclosed thereby, a universal connection between said stationary platform and said upper section, a dash pot, interposed between said stationary platform and said lower section, another dash pot interposed between said lower and upper sections, a valve for said first mentioned dash pot and a means for controlling the same, positioned in said first mentioned housing, a valve for said last mentioned dash pot, positioned in said last mentioned housing, and a means for controlling the same positioned exteriorly to said last mentioned housing.

Signed at New York in the county of New York and State of New York this 8th day of February, A. D. 1927.

JOHN F. HOWELL.